(12) United States Patent
Kurehashi et al.

(10) Patent No.: US 12,190,732 B2
(45) Date of Patent: Jan. 7, 2025

(54) CONTROL APPARATUS, MOVABLE OBJECT, CONTROL METHOD, AND TERMINAL

(71) Applicant: HONDA MOTOR CO., LTD., Tokyo (JP)

(72) Inventors: Takahiro Kurehashi, Saitama (JP); Shigeru Inoue, Saitama (JP); Moriya Horiuchi, Saitama (JP); Yuta Sakagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 224 days.

(21) Appl. No.: 17/835,920

(22) Filed: Jun. 8, 2022

(65) Prior Publication Data

US 2022/0406187 A1 Dec. 22, 2022

(30) Foreign Application Priority Data

Jun. 22, 2021 (JP) ................................. 2021-103630

(51) Int. Cl.
*B60W 40/04* (2006.01)
*B60W 50/14* (2020.01)
(Continued)

(52) U.S. Cl.
CPC ............. *G08G 1/162* (2013.01); *B60W 40/04* (2013.01); *B60W 50/14* (2013.01); *G06V 20/58* (2022.01);
(Continued)

(58) Field of Classification Search
CPC .......... G08G 1/166; G08G 1/162; G08G 1/04; G08G 1/005; G08G 1/096725;
(Continued)

(56) References Cited

U.S. PATENT DOCUMENTS 9,731,645 B1   8/2017   Taleb-Bendiab
2005/0073438 A1*  4/2005   Rodgers ................. G08G 1/161
                                                            340/944
(Continued)

FOREIGN PATENT DOCUMENTS

CN   109478372 A   3/2019
CN   110154889 A   8/2019
(Continued)

OTHER PUBLICATIONS

Office Action issued for counterpart Chinese Application 202210472804.6, issued by The State Intellectual Property Office of People's Republic of China on Jun. 1, 2023.
(Continued)

*Primary Examiner* — Stephen Holwerda (57) ABSTRACT

A control apparatus includes a risk area specification unit to specify a risk area outside a movable object, a transmission control unit to perform control to transmit alert information related to a position of the risk area to an outside of the movable object, a reception control unit to perform control to receive response information including information related to a position of another movable object that is response information to the alert information which is transmitted by the other movable object, and a control unit to execute control of the movable object based on position information of the risk area and the information related to the position of the other movable object which is acquired, in which the alert information includes information for controlling a mode related to a transmission cycle of the response information to be transmitted by the other movable object which has received the alert information.

18 Claims, 8 Drawing Sheets

(51) Int. Cl.
*G06V 20/58* (2022.01)
*G08G 1/01* (2006.01)
*G08G 1/0967* (2006.01)
*G08G 1/16* (2006.01)

(52) U.S. Cl.
CPC ..... *G08G 1/0133* (2013.01); *G08G 1/096725* (2013.01); *G08G 1/166* (2013.01); *B60W 2050/143* (2013.01); *B60W 2050/146* (2013.01); *B60W 2420/403* (2013.01); *B60W 2554/4029* (2020.02); *B60W 2554/4041* (2020.02); *B60W 2554/406* (2020.02)

(58) Field of Classification Search
CPC .... G08G 1/164; G08G 1/096708; G08G 1/16; G08G 1/167; G08G 1/0133; G08G 1/163; H04W 4/12; H04W 4/90; H04W 4/029; H04W 4/40; H04W 4/021; H04W 4/06; B60W 40/04; B60W 50/14; B60W 2554/4041; B60W 2554/4029; B60W 2420/403; B60W 30/09; B60W 2556/50; B60W 2050/143; B60W 2556/10; B60W 2556/65; B60W 2556/45; B60W 2556/05; B60W 30/0956; B60W 30/0953; B60W 2554/4042; B60W 2050/146; B60W 2554/20; B60W 2050/0064; B60W 2554/406; B60W 2756/10; G06V 20/54; G06V 20/52; G06V 20/58; G06V 20/56
See application file for complete search history.

(56) References Cited

U.S. PATENT DOCUMENTS

| | | | | |
|---|---|---|---|---|
| 2011/0090093 A1* | 4/2011 | Grimm | ................. | G08G 1/162 340/901 |
| 2013/0060400 A1* | 3/2013 | Hahne | ................. | G08G 1/161 701/1 |
| 2013/0201036 A1* | 8/2013 | Stählin | ................. | G08G 1/161 340/944 |
| 2014/0009275 A1* | 1/2014 | Bowers | ................. | G06Q 20/145 340/436 |
| 2014/0191884 A1* | 7/2014 | Maeda | ................. | H04W 4/40 340/944 |
| 2014/0324330 A1* | 10/2014 | Minemura | ............. | G08G 1/166 701/300 |
| 2015/0035685 A1* | 2/2015 | Strickland | .............. | B60Q 9/008 340/901 |
| 2017/0018187 A1* | 1/2017 | Kim | ....................... | G08G 1/005 |
| 2018/0129888 A1* | 5/2018 | Schubert | ................. | G06T 11/20 |
| 2018/0165527 A1 | 6/2018 | Park | | |
| 2018/0295474 A1* | 10/2018 | Lee | ........................ | G08G 1/093 |
| 2018/0310147 A1* | 10/2018 | Kim | ................... | H04W 68/005 |
| 2019/0143894 A1 | 5/2019 | Ikeda | | |
| 2019/0250621 A1 | 8/2019 | Ghannam | | |
| 2020/0349843 A1 | 11/2020 | Liu | | |
| 2020/0406747 A1* | 12/2020 | Sakai | ..................... | G08G 1/167 |
| 2022/0009504 A1 | 1/2022 | Tokunaga | | |
| 2022/0408307 A1 | 12/2022 | Ueno | | |

FOREIGN PATENT DOCUMENTS

| | | |
|---|---|---|
| CN | 110544390 A | 12/2019 |
| CN | 111164663 A | 5/2020 |
| CN | 111462497 A | 7/2020 |
| CN | 111586570 A | 8/2020 |
| JP | 2020102822 A | 7/2020 |
| JP | 2020202591 A | 12/2020 |
| WO | 2016157891 A1 | 10/2016 |
| WO | 2020202405 A1 | 10/2020 |
| WO | 2020261908 A1 | 12/2020 |

OTHER PUBLICATIONS

Office Action issued for counterpart Chinese Application 202210472804.6, issued by The State Intellectual Property Office of People's Republic of China on Jan. 27, 2024.

* cited by examiner

CONTROL APPARATUS, MOVABLE OBJECT, CONTROL METHOD, AND TERMINAL

The contents of the following Japanese patent application(s) are incorporated herein by reference:
NO. 2021-103630 filed on Jun. 22, 2021

BACKGROUND

1. Technical Field

The present invention relates to a control apparatus, a movable object, a control method, and a terminal.

2. Related Art

Patent document 1 describes reception of information of a dangerous event from a movable object having sensed the dangerous event that has occurred in an area where a plurality of movable objects are on the move. List of cited references
Patent document 1: Japanese Patent Application Publication No. 2020-102822

DESCRIPTION OF EXEMPLARY EMBODIMENTS

Hereinafter, the present invention will be described through embodiments of the invention, but the following embodiments do not limit the invention according to the claims. In addition, not all combinations of the features described in the embodiments necessarily have to be essential to solving means of the invention.

Figure 1:
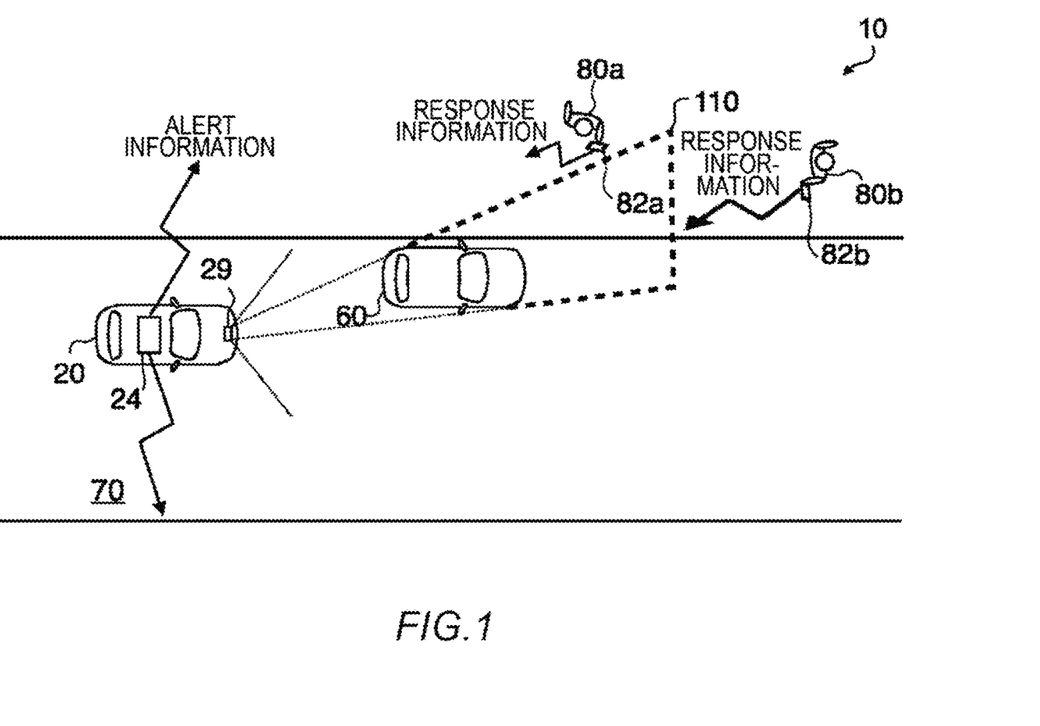
FIG. 1 schematically illustrates a usage scene of a warning system 10.

FIG. 1 schematically illustrates a usage scene of a warning system 10. The warning system 10 includes a vehicle 20, a terminal 82a, and a terminal 82b.

The vehicle 20 is one example of a movable object. The vehicle 20 includes a sensor 29 and a control apparatus 24. The sensor 29 is configured by including a camera. The control apparatus 24 includes a processing function of information acquired by the sensor 29, and a communication function.

The terminal 82a and the terminal 82b are terminals respectively possessed by a pedestrian 80a and a pedestrian 80b. According to the present embodiment, the pedestrian 80a and the pedestrian 80b may be collectively referred to as a "pedestrian 80". In addition, the terminals 82a and 82b may be collectively referred to as a "terminal 82". The terminal 82 is, for example, a mobile terminal such as a smartphone.

In FIG. 1, the vehicle 20 is a vehicle travelling along a road 70. A vehicle 60 is a vehicle parked on the road 70. For the vehicle 20, an area 110 on an advancing direction side of the vehicle 20 in front of the parked vehicle 60 is an area where it is difficult to be visually recognized from a position of the vehicle 20. The control apparatus 24 is configured to detect the area 110 that is not on a line of sight from the vehicle 20 as a risk area from an image in the advancing direction which has been acquired by the sensor 29. The control apparatus 24 transmits alert information including position information of the area 110 by a wireless signal. When the alert information is received, the terminal 82 is configured to transmit response information to the alert information by a wireless signal.

The control apparatus 24 includes, in the alert information, information for controlling a mode the terminal 82 to transmit the response information, and transmits the alert information. For example, the information for controlling the mode for transmitting the response information may be information for requesting periodic transmission of the response information. When the alert information is received, the terminal 82 transmits the response information at a predetermined transmission cycle. For example, when a current position of the terminal 82a is outside the area 110, the terminal 82a transmits response information including information indicating that the terminal 82a is located outside the risk area at a predetermined transmission cycle. In addition, when a current position of the terminal 82b is outside the area 110, the terminal 82b transmits response information including information indicating that the terminal 82b is located outside the risk area at a predetermined transmission cycle. With this configuration, when the control apparatus 24 does not receive response information including information indicating that a terminal is located inside the risk area from any of the terminals 82, it is possible to determine that the terminal 82 located in the risk area is not present.

Figure 2:
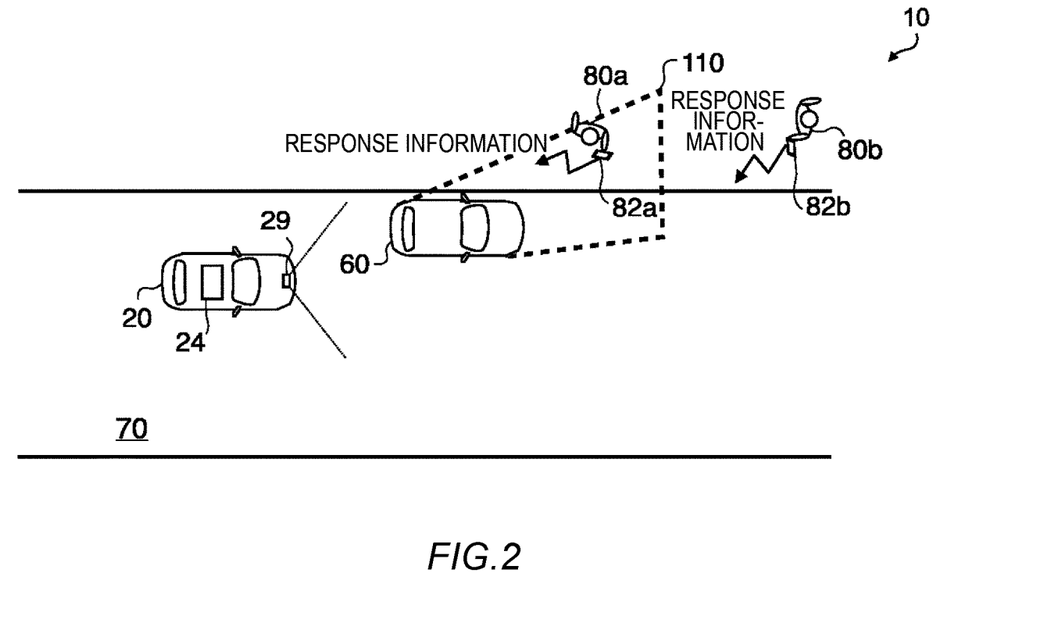
FIG. 2 illustrates a state where a pedestrian 80a enters an area 110.

FIG. 2 illustrates a state where the pedestrian 80a enters the area 110. In the state illustrated in FIG. 2, with regard to the terminal 82b, a current position of the terminal 82b is outside the area 110. For this reason, the terminal 82b ongoingly transmits the response information including the information indicating that the terminal 82b is located outside the risk area. On the other hand, when it is determined that a current position of the terminal 82a is within the area 110 at transmission timing of the response information, the terminal 82a transmits the response information including the information indicating that the terminal 82a is located in the risk area. For example, the terminal 82a transmits information indicating the current position of the terminal 82a.

With this configuration, the control apparatus 24 determines that the terminal 82a is located in the area 110 based on the response information received from the terminal 82a, and performs control of the vehicle 20. For example, the control apparatus 24 performs an alert display for an occupant of the vehicle 20. In addition, the control apparatus 24 determines whether there is a possibility that the pedestrian 80a approaches a position within a predetermined distance from the vehicle 20 based on a current position and a walking speed of the terminal 82a, and a current position and a vehicle speed of the vehicle 20. When it is determined that there is a possibility that the pedestrian 80a approaches the vehicle 20, the control apparatus 24 calculates a time period until the pedestrian 80a approaches the vehicle 20, and controls travelling of the vehicle 20 based on the calculated time period.

In this manner, the control apparatus 24 includes information for controlling a mode related to the transmission cycle of the response information in the alert information related to the risk area, and transmits the alert information. With this configuration, since it is possible to regularly receive the response information from the terminal 82 without repeating the transmission of the alert information and the reception of the response information, a delay time period until the response information is received from the terminal 82 can be shortened. In addition, even in a case where the pedestrian 80 is not present in the risk area at timing at which the alert information is transmitted, when the pedestrian 80 thereafter enters the risk area, the response information indicating that the pedestrian 80 is located in the risk area is transmitted from the terminal 82. For this reason, since it is possible to determine that the pedestrian 80 is located in the risk area from the response information transmitted after the pedestrian 80 enters the risk area without repeatedly transmitting the alert information, the control apparatus 24 can perform an alert for the occupant of the vehicle 20 or control of the travelling of the vehicle 20. In addition, since the terminal 82 regularly determines the current position of the terminal 82 after the alert information is received, in a case where the pedestrian 80 enters the risk area after the alert information is received, it is possible to issue an alert for the pedestrian 80. It should be noted that the risk area refers to a recognition of a state related to an external environment recognized by the vehicle 20 or the control apparatus 24. The risk area may be, for example, an area where there is a risk for the pedestrian 80 or the vehicle 20. The risk area may be, for example, an area where it is necessary to perform a safety check for the pedestrian 80 or the vehicle 20.

It should be noted that according to the present embodiment, for ease of the description, a case will be considered where it is determined on whether a pedestrian is present in a risk area. The pedestrian refers to a person who can make a passage on a road by a method without relaying on a vehicle. The pedestrian includes a person who makes a passage on a road using a wheel chair or the like. However, it may be determined on whether not only the pedestrian but also any movable object such as a person other than the pedestrian or another vehicle is present in the risk area. The person other than the pedestrian may include a person aboard a stopped vehicle.

Figure 3:
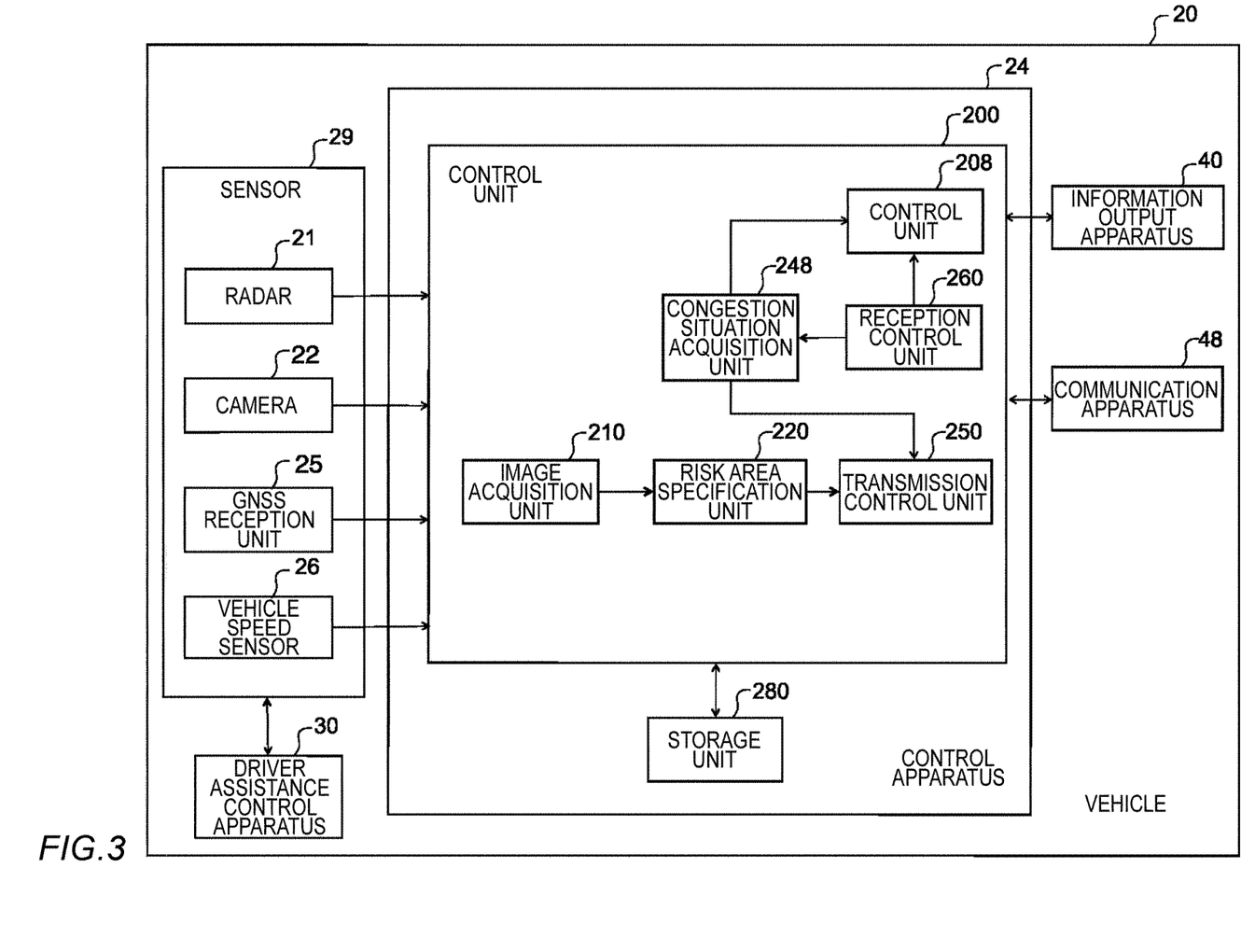
FIG. 3 illustrates a system configuration of a vehicle 20.

FIG. 3 illustrates a system configuration of the vehicle 20. The vehicle 20 includes a sensor 29, a driver assistance control apparatus 30, the control apparatus 24, a communication apparatus 48, and an information output apparatus 40.

The sensor 29 includes a radar 21, a camera 22, a GNSS reception unit 25, and a vehicle speed sensor 26. The radar 21 may be a LiDAR, a millimeter wave radar, or the like. The GNSS reception unit 25 is configured to receive radio waves emitted from a global navigation satellite system (GNSS) satellite. The GNSS reception unit 25 generates information indicating a current position of the vehicle 20 based on a signal received from the GNSS satellite. The camera 22 is one example of an image pickup unit mounted to the vehicle 20. The camera 22 is configured to generate image information by picking up an image of a surrounding of the vehicle 20. For example, the camera 22 generates the image information by picking up an image in the advancing direction of the vehicle 20. The camera 22 may be a single-lens camera. The camera 22 may be a multi-lens camera, and may be a camera that can acquire information of a distance to an object. The vehicle speed sensor 26 is configured to detect a vehicle speed of the vehicle 20. It should be noted that the sensor 29 may include a position sensor such as an odometer, or an inertial measurement unit (IMU) such as an acceleration sensor or an orientation sensor.

The driver assistance control apparatus 30 is configured to perform driver assistance of the vehicle 20 by using information detected by the sensor 29. The driver assistance control apparatus 30 may be realized by an ECU having a function of advanced driver-assistance systems (ADAS).

The communication apparatus 48 is responsible for communication with the terminal 82. For example, the communication between the communication apparatus 48 and the terminal 82 is responsible for wireless communication by LTE-V2X PC5.

The information output apparatus 40 is an apparatus configured to output warning information. The information output apparatus 40 may have a human machine interface (HMI) function. The information output apparatus 40 may include a head-up display or a navigation system. The information output apparatus 40 may also be a mobile terminal possessed by an occupant of the vehicle 20. The information output apparatus 40 may include a sound output apparatus configured to output warning information by a sound.

The control apparatus 24 includes a control unit 200 and a storage unit 280. The control unit 200 is realized by a circuit such as an arithmetic processing apparatus including, for example, a processor. The storage unit 280 is realized by including a nonvolatile storage medium. The control unit 200 is configured to perform processing by using information stored in the storage unit 280. The control unit 200 may be realized by an electronic control unit (ECU) including a microcomputer provided with a CPU, a ROM, a RAM, an I/O, a bus, and the like.

The control unit 200 includes an image acquisition unit 210, a risk area specification unit 220, a congestion situation acquisition unit 248, a control unit 208 for vehicle, a transmission control unit 250, and a reception control unit 260. It should be noted that a mode may be adopted in which the control unit 200 does not have a part of functions in a functional block illustrated in FIG. 3. For example, a mode may be adopted in which only a part of functions is implemented in the control unit 200, and the other function is implemented as a function of the sensor 29 or the other circuit.

The image acquisition unit 210 is configured to acquire image information of an image outside the vehicle 20. The image acquisition unit 210 acquires image information picked up by the camera 22 installed in the vehicle 20.

The risk area specification unit 220 is configured to specify a risk area outside the vehicle 20 where a risk is involved with respect to a movement of the vehicle 20. For example, the risk area specification unit 220 specifies the risk area based on an image acquired by the image acquisition unit 210. The risk area specification unit 220 specifies an area that is not on a line of sight from a position of the vehicle 20 as the risk area. In this manner, the risk area specification unit 220 may judge the area that is not on the line of sight by recognizing a target object from the image picked up by the camera 22 mounted to the vehicle 20. The target object is, for example, another vehicle, a construction such as a building, a street tree, or the like.

The area that is not on the line of sight when viewed from a position of the vehicle 20 is, for example, position information of an area where an occlusion occurs through shielding by a three-dimensional object such as another vehicle, a construction, or a street tree. The risk area specification unit 220 may specify the area that is not on the line of sight based on the image information and map information. The risk area specification unit 220 may receive position information of a non-line-of-sight area which is transmitted from an external apparatus such as the other vehicle 20 or the base transceiver station for mobile communication, and specify the non-line-of-sight area based on the received position information of the non-line-of-sight area. The external apparatus may be another vehicle passing through a position near the vehicle 20 or a server configured to collect the position information of the non-line-of-sight area. The server configured to collect the position information of the non-line-of-sight area may be an MEC server connected to the base transceiver station. The MEC server may hold the position information of the non-line-of-sight area which is transmitted from a plurality of vehicles passing nearby, and transmit the hold position information of the non-line-of-sight area to the vehicle 20 passing nearby.

The transmission control unit 250 is configured to perform, when the risk area specification unit 220 specifies the risk area, control to transmit the alert information related to the position of the risk area to an outside of the vehicle 20 without designating a destination. The transmission control unit 250 may cause the alert information to be transmitted by broadcast. "Transmission to the outside of the vehicle 20" may be transmission by broadcast to a surrounding communication device without designating a destination. "Transmission to the outside of the vehicle 20" may be transmission to be performed in a manner that a communication device outside the vehicle 20 can receive transmitted information irrespective of whether the transmitted information can be received by the communication device in the vehicle 20.

The reception control unit 260 is configured to perform control to receive response information including information related to a position of the terminal 82 that is response information to the alert information which is transmitted by the terminal 82. It should be noted that the terminal 82 is one example of "another movable object".

The alert information may include position information of the risk area. The alert information may include a plurality of latitude and longitude coordinates of the risk area. The alert information may include a plurality of pieces of coordinate information indicating a range of the risk area. The plurality of pieces of coordinate information may be coordinate information representing a geographical position of the risk area. When the risk area is polygonal, the plurality of coordinate information may be coordinate information of vertices of a polygon. The position information of the risk area may include coordinate information and distance information from a position indicated by the coordinate information. For example, coordinate information of a specific point of the risk area and distance information representing a size of the risk area while the point is set as a reference may be included.

The control unit 208 is configured to execute control of the vehicle 20 based on the position information of the risk area, and information related to a position of the other vehicle 60 which is acquired through the response information. For example, the control unit 208 executes driver assistance of the vehicle 20 or an alert for an occupant of the vehicle 20.

The alert information includes information for controlling a mode related to a transmission cycle of the response information to be transmitted by the other vehicle 20 which has received the alert information. With this configuration, the transmission control unit 250 requests the terminal 82 to control the transmission of the response information to the terminal 82 according to the mode related to the transmission cycle which has been transmitted using the alert information.

The mode related to the transmission cycle may include information indicating at least one of a number of at least one transmission of the response information or a transmission cycle of the response information. The mode related to the transmission cycle may include information indicating a period in which the response information is transmitted.

It should be noted that the transmission cycle of the response information to be transmitted by the terminal 82 may be shorter than the transmission cycle of the alert information to be transmitted by the transmission control unit 250. With this configuration, a transmission frequency of the alert information can be reduced.

The transmission control unit 250 may set the period in which the response information is transmitted to be shorter as a movement speed of the vehicle 20 is higher. The transmission control unit 250 may decide the period in which the response information is transmitted based on a time period until the vehicle 20 reaches a position of the risk area. With this configuration, it is possible to suppress continuation of the transmission of the response information by the terminal 82 for a long time period after the vehicle 20 passes through a position of the pedestrian 80.

The congestion situation acquisition unit 248 is configured to acquire a congestion situation of traffic in a surrounding of the vehicle 20. For example, the congestion situation acquisition unit 248 may acquire, through the reception control unit 260, information indicating a congestion situation which is distributed through a base transceiver station. The alert information may include information related to transmission power of the response information. When it is determined that the congestion situation acquired by the congestion situation acquisition unit 248 is more congested than a predetermined situation, the transmission control unit 250 may decrease the transmission power. With this configuration, a transmission range of the response information transmitted from the terminal 82 can be controlled according to the congestion situation.

The control unit 208 may control the execution of the driver assistance of the vehicle 20 or the alert for the occupant of the vehicle 20. For example, when the information output apparatus 40 includes a head-up display, the control unit 208 may cause the head-up display of the vehicle 20 to output light for forming a mark as warning information indicating that a pedestrian is present in the risk area. In addition, the control unit 208 causes the head-up display to output light for forming a mark in a display region corresponding to a position of the risk area where the pedestrian is present. The control unit 208 may project the light for forming a mark towards a reflective part provided to a windshield of the vehicle 20. It should be noted that the control unit 208 may output the warning information by a sound or a character. The control unit 208 may control the travelling of the vehicle 20 through the driver assistance control apparatus 30.

Figure 4:
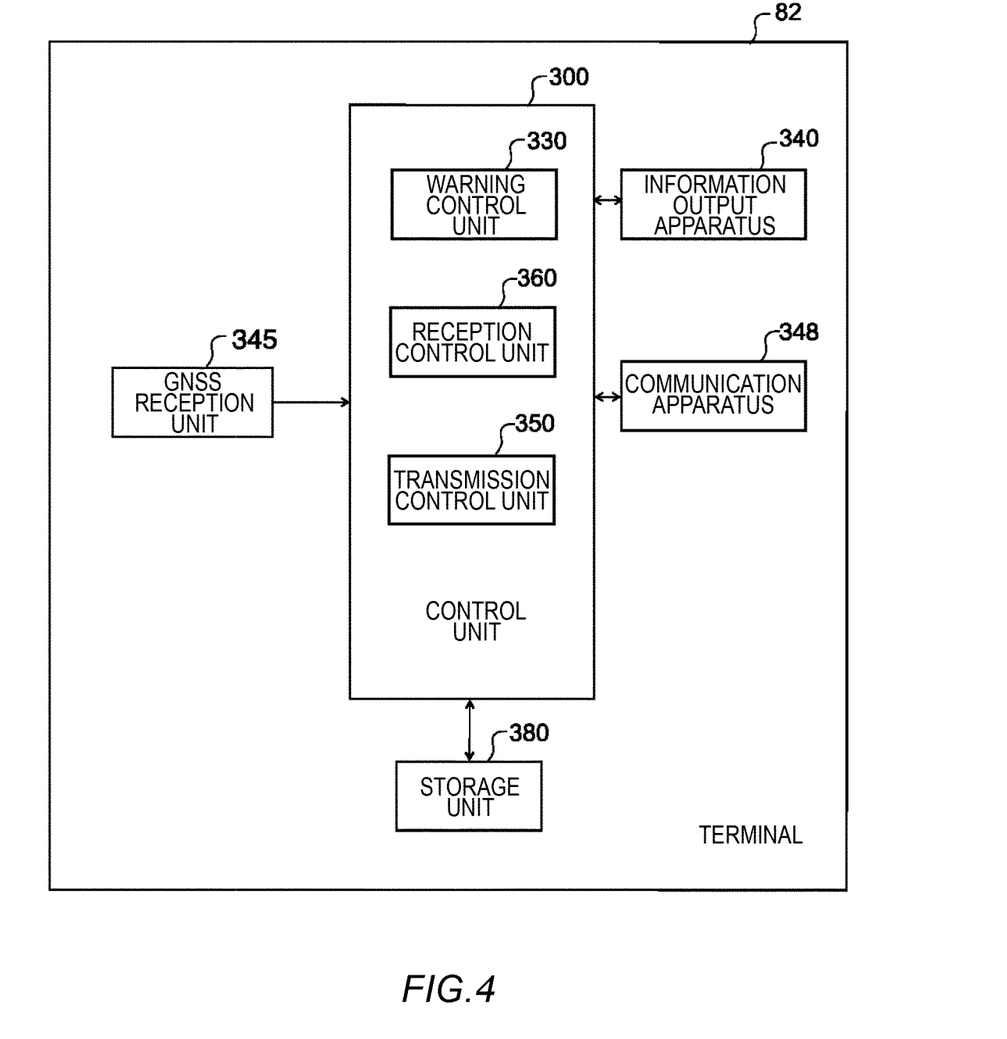
FIG. 4 illustrates a system configuration of a terminal 82.

FIG. 4 illustrates a system configuration of the terminal 82. The terminal 82 includes a control unit 300, an information output apparatus 340, a communication apparatus 348, a GNSS reception unit 345, and a storage unit 380.

The GNSS reception unit 345 is configured to receive radio waves emitted from a GNSS satellite. The GNSS reception unit 345 generates information indicating a current position of the terminal 82 based on a signal received from the GNSS satellite.

The control unit 300 is realized by a circuit such as an arithmetic processing apparatus including, for example, a processor. The storage unit 380 is realized by including a nonvolatile storage medium. The control unit 300 is configured to perform processing by using information stored in the storage unit 380. The control unit 300 may be realized by an electronic control unit (ECU) including a microcomputer provided with a CPU, a ROM, a RAM, an I/O, a bus, and the like.

The control unit 300 includes a warning control unit 330, a transmission control unit 350, and a reception control unit 360. It should be noted that a mode may be adopted in which the control unit 300 does not have a part of functions in a functional block illustrated in FIG. 4. For example, a mode may be adopted in which only a part of functions is implemented in the control unit 300, and the other function is implemented as a function of the other external circuit.

The information output apparatus 340 is an apparatus configured to output warning information to a position in the vicinity of the terminal 82. The information output apparatus 340 may have a human machine interface (HMI) function. The information output apparatus 340 may be other equipment kept by a person who possesses the terminal 82. The information output apparatus 340 may include a sound output function for outputting warning information by a sound.

The reception control unit 360 is configured to perform control to receive alert information related to a position of the risk area where a risk is involved for a movement of the external vehicle 20. The transmission control unit 350 is configured to perform control to transmit, to the outside, response information including information related to a position of the terminal 82 that is the response information to the alert information. The alert information includes information for controlling the mode related to the transmission cycle of the response information. When the position of the terminal is in the risk area or within a predetermined range from the position of the risk area, the transmission control unit 350 switches the mode related to the transmission cycle of the response information based on the information included in the alert information.

For example, when the information for controlling the mode related to the transmission cycle includes information indicating the transmission cycle of the response information, the transmission control unit 350 repeats transmission of the response information at the transmission cycle indicated by the information included in the alert information. With this configuration, the terminal 82 can transmit response information related to a latest position of the terminal 82 multiple times in response to reception of a single piece of alert information.

It should be noted that in a case where the alert information that does not include the information for controlling the mode related to the transmission cycle is received, the transmission control unit 350 may transmit the response information once each time the alert information is received. The response information may include information of the current position of the terminal 82 which is generated by the GNSS reception unit 345. The response information may include information indicating whether the current position of the terminal 82 is located in the risk area.

Figure 5:
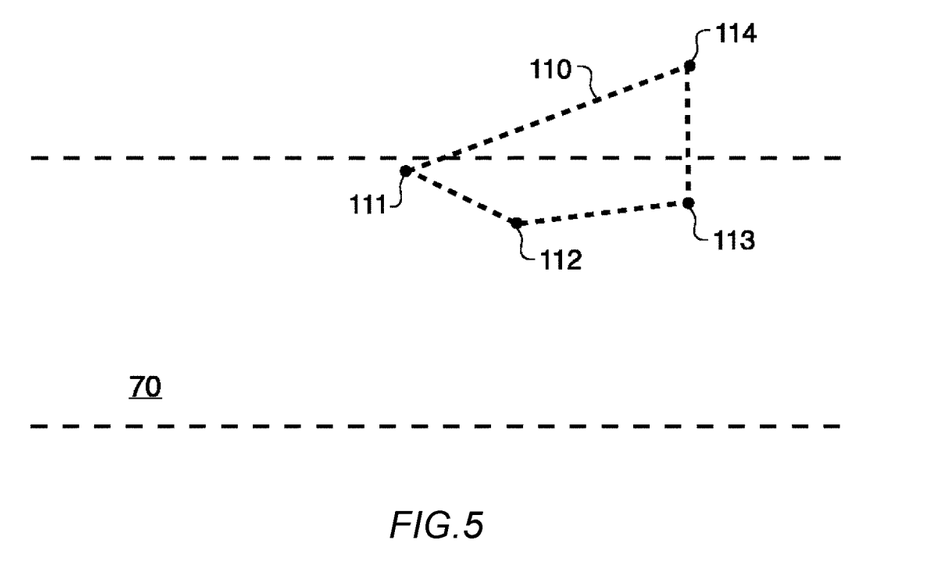
FIG. 5 conceptually illustrates position information of a risk area managed by a control apparatus 24.

FIG. 5 conceptually illustrates position information of the risk area managed by the control apparatus 24. Herein, a case will be illustrated where the risk area is polygonal.

The risk area specification unit 220 calculates coordinates of each of four points including a point 111, a point 112, a point 113, and a point 114 which represent a contour of the area 110. The area 110 is a closed region formed by linking the coordinates of the point 111, the point 112, the point 113, and the point 114. The control apparatus 24 stores the coordinates of each of the point 111, the point 112, the point 113, and the point 114 in association with an area ID assigned to the area 110. The transmission control unit 250 transmits alert information including the area ID and the coordinates indicating the area 110.

In addition, when the terminal 82 receives the alert information, the terminal 82 determines whether the current position of the terminal 82 is included in an area surrounded by the four points indicated by the coordinates included in the position information. When the current position of the terminal 82 is included in the area surrounded by the four points, the terminal 82 transmits response information including the area ID of the risk area where the terminal 82 is present to the vehicle 20 corresponding to a transmission source of the alert information.

It should be noted that when the risk area is circular, the position information of the risk area may include coordinate information of a central point of the risk area and diameter information of the risk area. When the risk area is elliptical, the position information of the risk area may include coordinate information of a central point of the risk area and major axis, minor axis, and azimuth angle information. When the risk area is polygonal, the position information of the risk area may include coordinate information of a point corresponding to a reference of a polygon and length information of sides such as a width and a height of the risk area.

Figure 6:
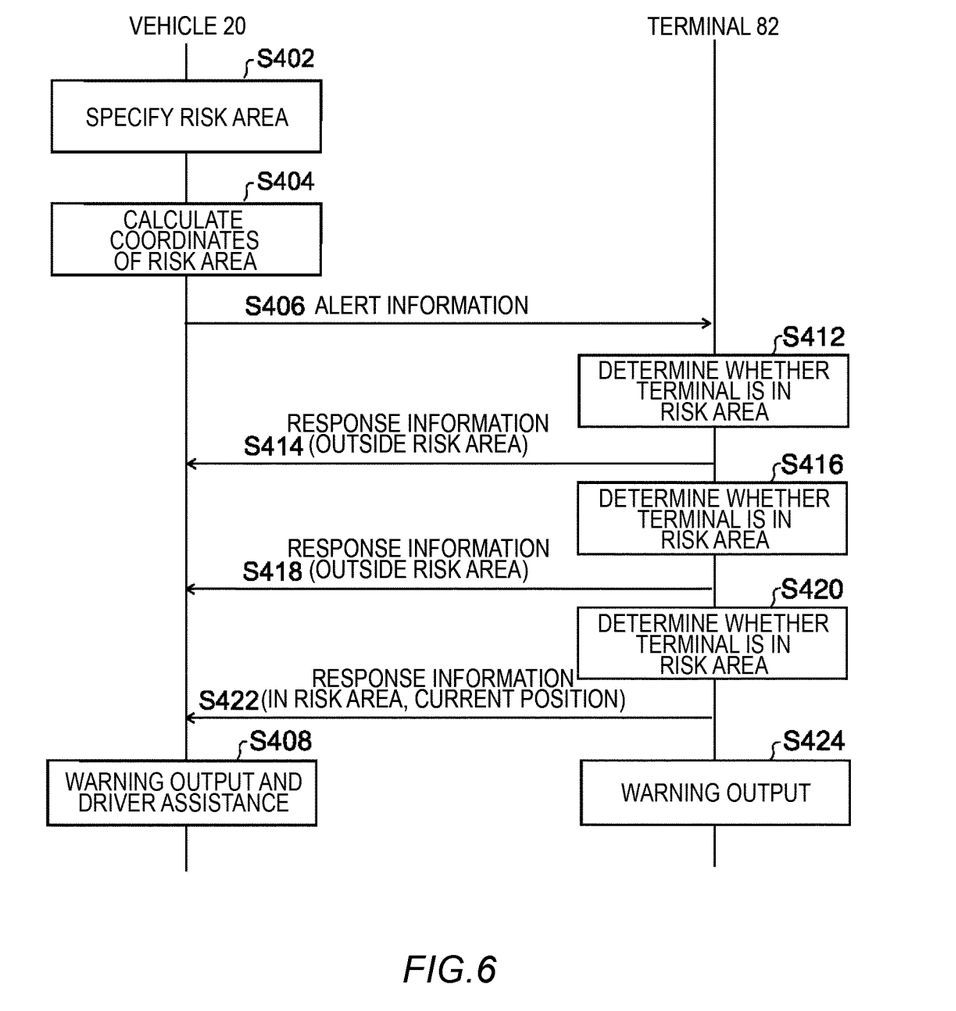
FIG. 6 generally illustrates a flow of processing executed by the vehicle 20 and the terminal 82.

FIG. 6 generally illustrates a processing flow related to a control method executed by the vehicle 20 and the terminal 82.

In S402, the risk area specification unit 220 specifies a non-line-of-sight area in an advancing direction of the vehicle 20 as the risk area from an image picked up by the camera 22. In S404, the risk area specification unit 220 calculates coordinates of the risk area. The risk area specification unit 220 calculates the coordinates of the risk area based on a current position of the vehicle 20, an orientation of the vehicle 20, and a distance to the other vehicle 60 which is measured by the sensor 29.

In S406, the transmission control unit 250 transmits alert information through the communication apparatus 48. The alert information may include an area ID, coordinate information of the risk area, transmission source information of the alert information, and information for requesting periodic transmission of the response information. The area ID is identification information for uniquely specifying the risk area specified in S402. The area ID may be identification information to be decided by the control apparatus 24. The transmission source information is identification information for uniquely specifying the vehicle 20 corresponding to a transmission source of the alert information.

When the terminal 82 receives the alert information transmitted from the vehicle 20 under the control of the reception control unit 360, in S412, the transmission control unit 350 judges whether a current position of the terminal 82 is in the risk area. When the current position of the terminal 82 is outside the risk area, in S414, the transmission control unit 350 causes response information indicating the presence of a pedestrian outside the risk area to be transmitted to the vehicle 20 through the communication apparatus 348. When the response information received from the terminal 82 indicates the presence of the pedestrian outside the risk area, the control apparatus 24 of the vehicle 20 discards the response information.

Subsequently, after the response information is transmitted in S414, when a predetermined transmission cycle T elapses, the transmission control unit 350 judges whether a current position of the terminal 82 is in the risk area (S416). When the current position of the terminal 82 is outside the risk area, in S418, the transmission control unit 350 causes response information indicating the presence of the pedestrian outside the risk area to be transmitted to the vehicle 20 through the communication apparatus 348. When the response information received from the terminal 82 indicates the presence of a pedestrian outside the risk area, the control apparatus 24 of the vehicle 20 discards the response information.

Subsequently, after the response information is transmitted in S418, when the transmission cycle T elapses, the transmission control unit 350 judges whether a current position of the terminal 82 is in the risk area (S420). When the current position of the terminal 82 is in the risk area, in S422, the transmission control unit 350 causes response information indicating the presence of the pedestrian in the risk area and the current position of the terminal 82 to be transmitted to the vehicle 20 through the communication apparatus 348. In addition, in S424, the warning control unit 330 causes a warning for the pedestrian 80 to be output through the information output apparatus 340.

In the vehicle 20, when the response information received from the terminal 82 indicates the presence of the pedestrian in the risk area, in S408, the control unit 208 performs a warning output through the information output apparatus 40. In addition, the control unit 208 performs driver assistance through the driver assistance control apparatus 30 based on the current position of the terminal 82 indicated by the response information, the current position of the vehicle 20, and the vehicle speed of the vehicle 20.

In according to the processing illustrated in FIG. 6, even when the vehicle 20 does not the warning information, since the response information indicating whether the terminal 82 is located in the risk area is repeatedly transmitted, the vehicle 20 can determine the presence of the terminal 82 in the risk area on a timely basis. Thus, the warning output for the occupant of the vehicle 20 and the driver assistance can be performed on a timely basis. In addition, in the terminal 82, the warning output for the pedestrian 80 can be performed on a timely basis. Thus, even when the vehicle 20 does not repeatedly transmit the alert information, the warning output and the driver assistance can be appropriately performed.

It should be noted that in S406, the transmission control unit 250 may include, in the alert information, information indicating at least one of the transmission cycle of the response information, the number of transmissions of the response information, the transmission period in which the response information is repeatedly transmitted, or the transmission power of the response information, and transmit the alert information. The transmission control unit 250 may decide at least one of the transmission cycle of the response information, the number of transmissions of the response information, the transmission period in which the response information is repeatedly transmitted, or the transmission power of the response information based on a speed of the vehicle 20. The transmission control unit 250 may decide at least one of the transmission cycle of the response information, the number of transmissions of the response information, the transmission period in which the response information is repeatedly transmitted, or the transmission power of the response information based on a congestion situation of traffic on the road 70.

For example, the transmission control unit 250 may shorten the transmission cycle of the response information as the speed of the vehicle 20 is higher. The transmission control unit 250 may increase the number of transmissions of the response information per unit time as the speed of the vehicle 20 is higher. The transmission control unit 250 may shorten the transmission period of the response information as the speed of the vehicle 20 is higher. The transmission control unit 250 may set the transmission cycle of the response information to be longer than a predetermined cycle when a congestion degree on the road 70 is higher than a predetermined congestion degree. The transmission control unit 250 may decrease the number of transmissions of the response information per unit time when a congestion degree of traffic on the road 70 is higher than a predetermined congestion degree. The transmission control unit 250 may lengthen the transmission period of the response information when a congestion degree on the road 70 is higher than a predetermined congestion degree.

Figure 7:
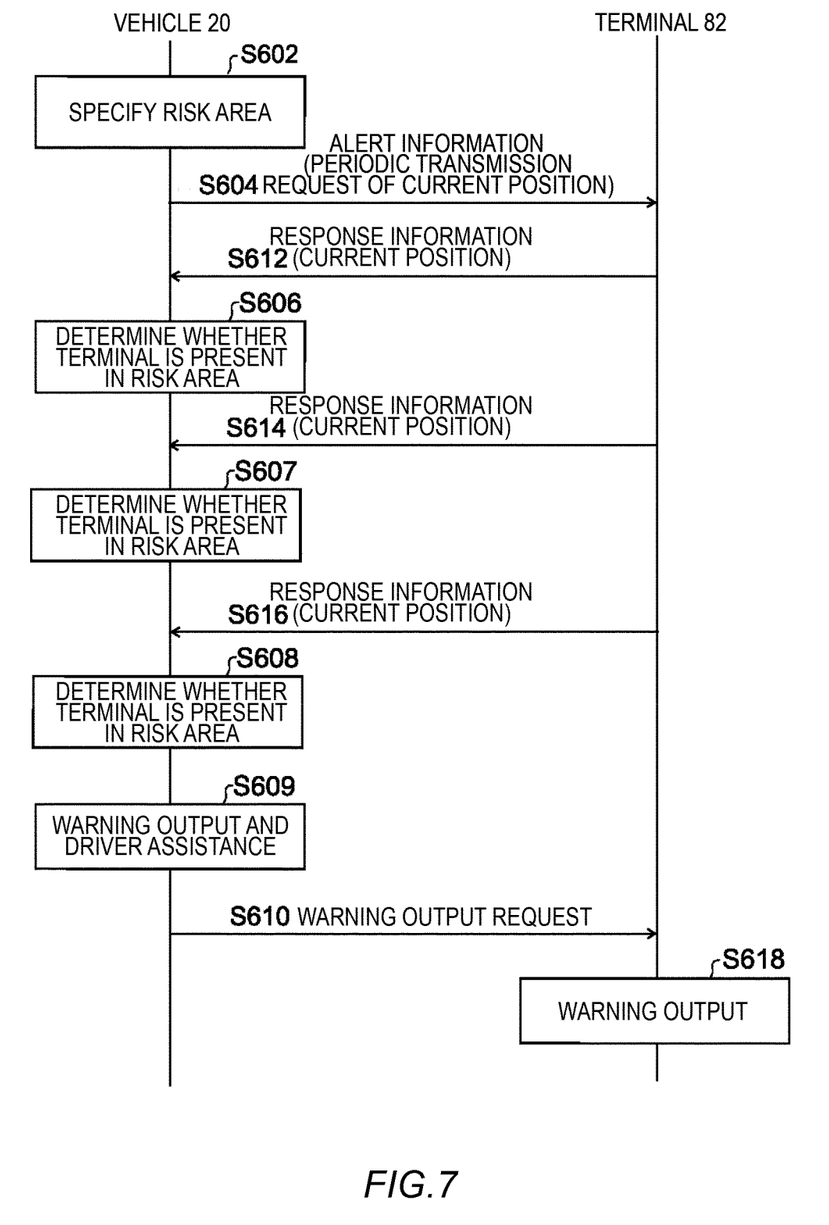
FIG. 7 generally illustrates a flow of other processing executed by the vehicle 20 and the terminal 82.

FIG. 7 generally illustrates a flow of other processing related to the control method executed by the vehicle 20 and the terminal 82. FIG. 7 illustrates a processing flow in a case where the terminal 82 is caused to periodically transmit response information including position information of the terminal 82.

In S602, the risk area specification unit 220 specifies the risk area. The processing in S602 is in a same manner as the processing in S402. When the risk area is specified, in S604, the transmission control unit 250 transmits alert information through the communication apparatus 48. The alert information may include transmission source information of the alert information and information for requesting periodic transmission of the response information. The transmission source information is identification information for uniquely specifying the vehicle 20 corresponding to the transmission source of the alert information.

In S612, when the terminal 82 receives the alert information transmitted from the vehicle 20 under the control of the reception control unit 360, the transmission control unit 350 causes the response information indicating the current position of the terminal 82 which is generated by the GNSS reception unit 345 to be transmitted to the vehicle 20 through the communication apparatus 348.

In S606, the control unit 208 determines whether the terminal 82 is present in the risk area specified by the risk area specification unit 220 based on the current position of the terminal 82 which is included in the received response information. When the terminal 82 is not present in the risk area specified by the risk area specification unit 220, the response information is discarded.

Subsequently, in the terminal 82, after the response information is transmitted in S612, when the predetermined transmission cycle T elapses, in S614, the transmission control unit 350 causes the response information indicating the current position of the terminal 82 which is generated by the GNSS reception unit 345 to be transmitted to the vehicle 20 through the communication apparatus 348.

In S607, the control unit 208 determines whether the terminal 82 is present in the risk area specified by the risk area specification unit 220 based on the current position of the terminal 82 which is included in the received response information. When the terminal 82 is not present in the risk area specified by the risk area specification unit 220, the response information is discarded.

Subsequently, in the terminal 82, after the response information is transmitted in S614, when the predetermined transmission cycle T elapses, in S616, the transmission control unit 350 causes the response information indicating the current position of the terminal 82 which is generated by the GNSS reception unit 345 to be transmitted to the vehicle 20 through the communication apparatus 348.

In S608, the control unit 208 determines whether the terminal 82 is present in the risk area specified by the risk area specification unit 220 based on the current position of the terminal 82 which is included in the received response information. When the terminal 82 is present in the risk area specified by the risk area specification unit 220, in S609, the control unit 208 performs a warning output through the information output apparatus 40. In addition, the control unit 208 performs driver assistance through the driver assistance control apparatus 30 based on the current position of the terminal 82 which is indicated by the response information, and the current position of the vehicle 20 and the vehicle speed of the vehicle 20. In addition, in S610, the transmission control unit 250 transmits a warning output request for requesting an output of warning information for the pedestrian 80 to the terminal 82. In S618, when the warning output request is received from the vehicle 20, the warning control unit 330 causes a warning for the pedestrian 80 to be output through the information output apparatus 340.

It should be noted that in S604, the transmission control unit 250 may cause the position information of the risk area to be included in the alert information and transmitted. When the position information of the risk area is included in the alert information, in S612, S614, and S616, the transmission control unit 350 of the terminal 82 may cause the response information to be transmitted under a condition that the current position of the terminal 82 is within a predetermined range including the position of the risk area.

In addition, as described in relation to FIG. 6, the transmission control unit 250 may include, in the alert information, information indicating at least one of the transmission cycle of the response information, the number of transmissions of the response information, the transmission period in which the response information is repeatedly transmitted, or the transmission power of the response information, and transmit the alert information. The transmission control unit 250 may decide at least one of the transmission cycle of the response information, the number of transmissions of the response information, the transmission period in which the response information is repeatedly transmitted, or the transmission power of the response information based on the speed of the vehicle 20. The transmission control unit 250 may decide at least one of the transmission cycle of the response information, the number of transmissions of the response information, the transmission period in which the response information is repeatedly transmitted, or the transmission power of the response information based on the congestion situation of the traffic on the road 70.

In accordance with the processing illustrated in FIG. 7 too, even when the vehicle 20 does not repeatedly transmit the warning information, since the terminal 82 repeatedly transmits the response information indicating the current position, the vehicle 20 can determine whether the terminal 82 is present in the risk area on a timely basis. Thus, the warning output for the occupant of the vehicle 20 and the driver assistance can be performed on a timely basis. In addition, in the terminal 82, the warning output for the pedestrian 80 can be performed on a timely basis. Thus, even when the vehicle 20 does not repeatedly transmit the alert information, the warning output and the driver assistance can be appropriately performed.

It should be noted that the communication between the control apparatus 24 and the terminal 82 may be performed by short distance direct communication in Cellular-V2X. Examples of the short distance direct communication in Cellular-V2X include communication standards such as LTE-V2X PC5 and 5G-V2X PC5. A mode using Wi-Fi (registered trademark) or dedicated short range communications (DSRC) may be adopted as the direct communication. The control apparatus 24 may communicate with the terminal 82 via a base transceiver station. In addition, for the communication between the control apparatus 24 and the terminal 82, in addition to Cellular-V2X or DSRC (registered trademark), any direct communication standard such as Bluetooth (registered trademark) may be adopted. The control apparatus 24 may perform the direct communication with the terminal 82 and the control apparatus 24 of the other vehicle 20 by using communication infrastructure included in intelligent transport systems (ITS).

It should be noted that the vehicle 20 is one example of transport equipment. The transport equipment includes a motor vehicle such as a passenger vehicle or a bus, a riding saddle riding type vehicle, a bicycle, or the like. In addition, the movable object includes, in addition to a person, transport equipment such as a motor vehicle like a passenger vehicle or a bus, a saddle riding type vehicle, or a bicycle.

Figure 8:
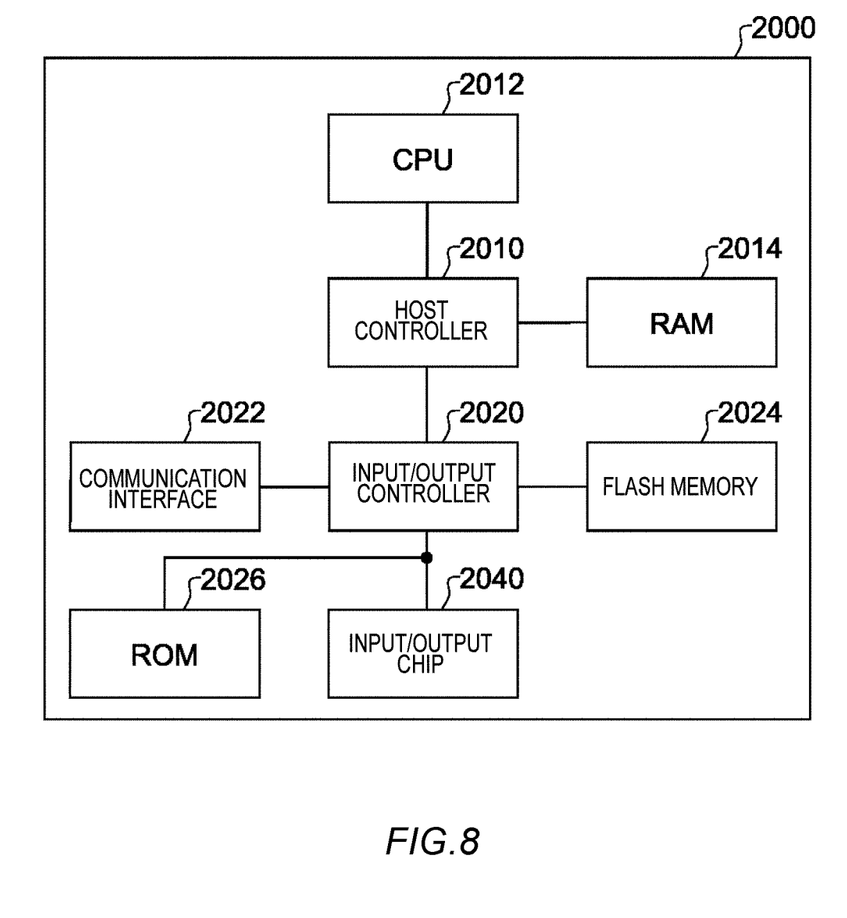
FIG. 8 illustrates an example of a computer 2000.

FIG. 8 illustrates an example of a computer 2000 where a plurality of embodiments of the present invention may be entirely or partially embodied. Programs installed in the computer 2000 can cause the computer 2000 to: function as apparatuses such as the control apparatus 24 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, or an HDMI (registered trademark) port.

The programs are provided via a network or a computer readable medium such as a CD-ROM, a DVD-ROM, or a memory card. The RAM 2014, the ROM 2026, or the flash memory 2024 is an example of the computer readable medium. The programs are installed in the flash memory 2024, the RAM 2014, or the ROM 2026, and are executed by the CPU 2012. Information processing written in these programs is read by the computer 2000, and provides cooperation between the programs and the various types of hardware resources described above. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. The communication interface 2022, under the control of the CPU 2012, reads transmission data stored in a transmission buffer processing region provided in a recording medium such as the RAM 2014 and the flash memory 2024, sends the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs to write back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of the plurality of entries described above, an entry with the attribute value of the first attribute specified that meets a condition, read the attribute value of the second attribute stored in above described entry, and thereby acquire the attribute value of the second attribute associated with the first attribute meeting a predetermined condition.

The programs or software module described above may be stored on the computer 2000 or in a computer readable medium near the computer 2000. A recording medium such as a hard disk or RAM provided in a server system connected to a dedicated communication network or the Internet can be used as the computer readable medium. The programs stored in the computer readable medium may be provided to the computer 2000 via the network.

The program that is installed in the computer 2000 and causes the computer 2000 to function as the control unit 200 may instruct the CPU 2012 or the like to cause the computer 2000 to function as each unit of the control unit 200. The information processing written in these programs are read by the computer 2000 to cause the computer to function as each unit of the control unit 200, which is specific means realized by the cooperation of software and the various types of hardware resources described above. Then, these specific means implement operations or processing of information according to the intended use of the computer 2000 in the present embodiment, so that the control unit 200 is constructed as a specific control unit according to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer readable instruction stored on a computer readable medium, and/or a processor supplied along with the computer readable instruction stored on the computer readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer readable medium may include any tangible device capable of storing an instruction executed by an appropriate device, so that the computer readable medium having the instruction stored thereon constitutes at least a part of a product including an instruction that may be executed in order to provide means to execute an operation specified by a processing procedure or a block diagram. Examples of the computer readable media may include an electronic storage medium, a magnetic storage medium, an optical storage medium, an electromagnetic storage medium, a semiconductor storage medium, or the like. More specific examples of the computer readable medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include either source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 warning system; 20 vehicle; 21 radar; 22 camera; 24 control apparatus; 25 GNSS reception unit; 26 vehicle speed sensor; 29 sensor; 30 driver assistance control apparatus; 40 information output apparatus; 48 communication apparatus; 60 vehicle; 70 road; 80 pedestrian; 82 terminal; 110 area; 111, 112, 113, 114 point; 200 control unit; 208 control unit; 210 image acquisition unit; 220 risk area specification unit; 248 congestion situation acquisition unit; 250 transmission control unit; 260 reception control unit; 280 storage unit; 300 control unit; 330 warning control unit; 340 information output apparatus; 345 GNSS reception unit; 348 communication apparatus; 350 transmission control unit; 360 reception control unit; 380 storage unit; 2000 computer; 2010 host controller; 2012 CPU; 2014 RAM; 2020 input/output controller; 2022 communication interface; 2024 flash memory; 2026 ROM; 2040 input/output chip

What is claimed is:

1. A control apparatus comprising:
    at least one processor;
    a risk area specification unit configured to specify, using the at least one processor, a risk area outside a movable object where a risk is involved with respect to a movement of the movable object;
    a transmission control unit configured to perform, using the at least one processor, when the risk area specification unit specifies the risk area, control to transmit alert information related to a position of the risk area to an outside of the movable object without designating a destination;
    a reception control unit configured to perform, using the at least one processor, control to receive response information transmitted by an other movable object in response to the alert information, the response information including information related to a position of the other movable object; and
    a control unit configured to execute, using the at least one processor, control of the movable object based on position information of the risk area and the information related to the position of the other movable object which is acquired through the response information, wherein
    the alert information includes information for controlling a mode related to a transmission cycle of the response information to be transmitted by the other movable object which has received the alert information.

2. The control apparatus according to claim 1, wherein the transmission cycle of the response information is shorter than a transmission cycle of the alert information.

3. The control apparatus according to claim 1, wherein the transmission control unit is configured to perform, using the at least one processor, control to transmit the alert information including a plurality of latitude and longitude coordinates of the risk area by broadcast.

4. The control apparatus according to claim 1, wherein the risk area specification unit is configured to specify, using the at least one processor, an area that is not on a line of sight from a position of the movable object as the risk area.

5. The control apparatus according to claim 4, wherein the risk area specification unit is configured to judge, using the at least one processor, the area that is not on the line of sight by recognizing a target object from an image picked up by an image pickup unit mounted to the movable object.

6. The control apparatus according to claim 1, wherein the mode includes information indicating at least a number of at least one transmission of the response information or the transmission cycle of the response information.

7. The control apparatus according to claim 1, wherein the mode includes information indicating a period in which the response information is transmitted.

8. The control apparatus according to claim 7, wherein the transmission control unit is configured to set, using the at least one processor, the period in which the response information is transmitted to be shorter as a movement speed of the movable object is higher.

9. The control apparatus according to claim 7, wherein the transmission control unit is configured to decide, using the at least one processor, the period in which the response information is transmitted based on a time period until the movable object reaches the position of the risk area.

10. The control apparatus according to claim 1, further comprising:
    a congestion situation acquisition unit configured to acquire, using the at least one processor, a congestion situation of traffic in a surrounding of the movable object, wherein
    the alert information includes information related to transmission power of the response information, and
    the transmission control unit is configured to reduce, using the at least one processor, the transmission power when it is determined that the congestion situation acquired by the congestion situation acquisition unit is more congested than a predetermined situation.

11. The control apparatus according to claim 1, wherein the control unit is configured to execute, using the at least one processor, driver assistance of the movable object or an alert for an occupant of the movable object.

12. The control apparatus according to claim 1, wherein the movable object is a vehicle.

13. A movable object comprising the control apparatus according to claim 1.

14. The control apparatus according to claim 1, wherein
    when it is determined that the other movable object is located outside the risk area, the control apparatus controls the other movable object to transmit, at the transmission cycle included in the alert information, the response information indicating that the other movable object is located outside the risk area, and
    when it is determined that the other movable object is located within the risk area, the control apparatus controls the other movable object to transmit the response information indicating a current position of the other movable object.

15. A control method comprising:
specifying a risk area outside a movable object where a risk is involved with respect to a movement of the movable object;
performing, when the risk area is specified, control to transmit alert information related to a position of the risk area to an outside of the movable object without designating a destination;
performing control to receive response information transmitted by an other movable object in response to the alert information, the response information including information related to a position of the other movable object; and
executing control of the movable object based on position information of the risk area and the information related to the position of the other movable object which is acquired through the response information, wherein
the alert information includes information for controlling a mode related to a transmission cycle of the response information to be transmitted by the other movable object which has received the alert information.

16. A terminal comprising:
at least one processor;
a reception control unit configured to perform, using the at least one processor, control to receive alert information related to a position of a risk area where a risk is involved with respect to a movement of an external movable object, the alert information being transmitted by the external movable object; and
a transmission control unit configured to perform, using the at least one processor, control to transmit, to the external movable object, response information including information related to a position of the terminal in response to receiving the alert information, wherein
the alert information includes information for controlling a mode related to a transmission cycle at which the terminal transmits the response information, and
the transmission control unit is configured to switch, using the at least one processor, the mode related to the transmission cycle based on the information included in the alert information when the position of the terminal is in the risk area or within a predetermined range from the position of the risk area.

17. The terminal according to claim 16, wherein
the alert information includes information indicating a period in which transmission of the response information is regularly performed, and
the transmission control unit is configured to switch, using the at least one processor, the mode related to the transmission cycle of the response information during the period when the position of the terminal is in the risk area or within the predetermined range from the position of the risk area.

18. The terminal according to claim 16, wherein
the transmission control unit is configured to judge, using the at least one processor, whether a current position of the terminal is located within the risk area or outside the risk area,
when the transmission control unit judges that the current position of the terminal is located outside the risk area, the transmission control unit transmits, at the transmission cycle included in the alert information, the response information indicating that the terminal is located outside the risk area, and
when the transmission control unit judges that the current position of the terminal is located within the risk area, the transmission control unit transmits the response information indicating the current position of the terminal.

* * * * *